United States Patent [19]

Wolf

[11] Patent Number: 4,586,043

[45] Date of Patent: Apr. 29, 1986

[54] DISTRIBUTION SENSITIVE CONSTANT FALSE ALARM RATE (CFAR) PROCESSOR

[75] Inventor: Mary L. Wolf, Baltimore, Md.

[73] Assignee: The United States of America as represented by the Secretary of the Air Force, Washington, D.C.

[21] Appl. No.: 592,036

[22] Filed: Mar. 21, 1984

[51] Int. Cl.$^4$ ............................................. G01S 7/02
[52] U.S. Cl. ................................................ 343/5 CF
[58] Field of Search ................ 343/5 R, 5 CF, 7 A, 343/5 VQ, 5 CE

[56] References Cited

U.S. PATENT DOCUMENTS

| 3,778,822 | 12/1973 | Bauer | 343/5 R |
| 3,829,858 | 8/1974 | Bergkvist | 343/7 A |
| 4,249,177 | 2/1981 | Chen | 343/7 A |
| 4,318,101 | 3/1982 | Musha et al. | 343/5 CF |
| 4,360,811 | 11/1982 | Cantwell et al. | 343/7 A |
| 4,386,353 | 5/1983 | Bleijerveld et al. | 343/7 A |

Primary Examiner—Thomas H. Tarcza
Assistant Examiner—D. Hayes
Attorney, Agent, or Firm—Donald J. Singer; Willard R. Matthews

[57] ABSTRACT

In a radar receiver, a distribution sensitive constant false alarm rate processor derives the clutter threshold level from the average magnitude of echo return signals. The threshold level continuously adjusts to the changing conditions of the radar environment and correctly corresponds to the false alarm rates which may be varied by the user of the host radar system. The clutter threshold is then used to suppress clutter returns following either a Rayleigh distribution or a Weibull distribution.

1 Claim, 1 Drawing Figure

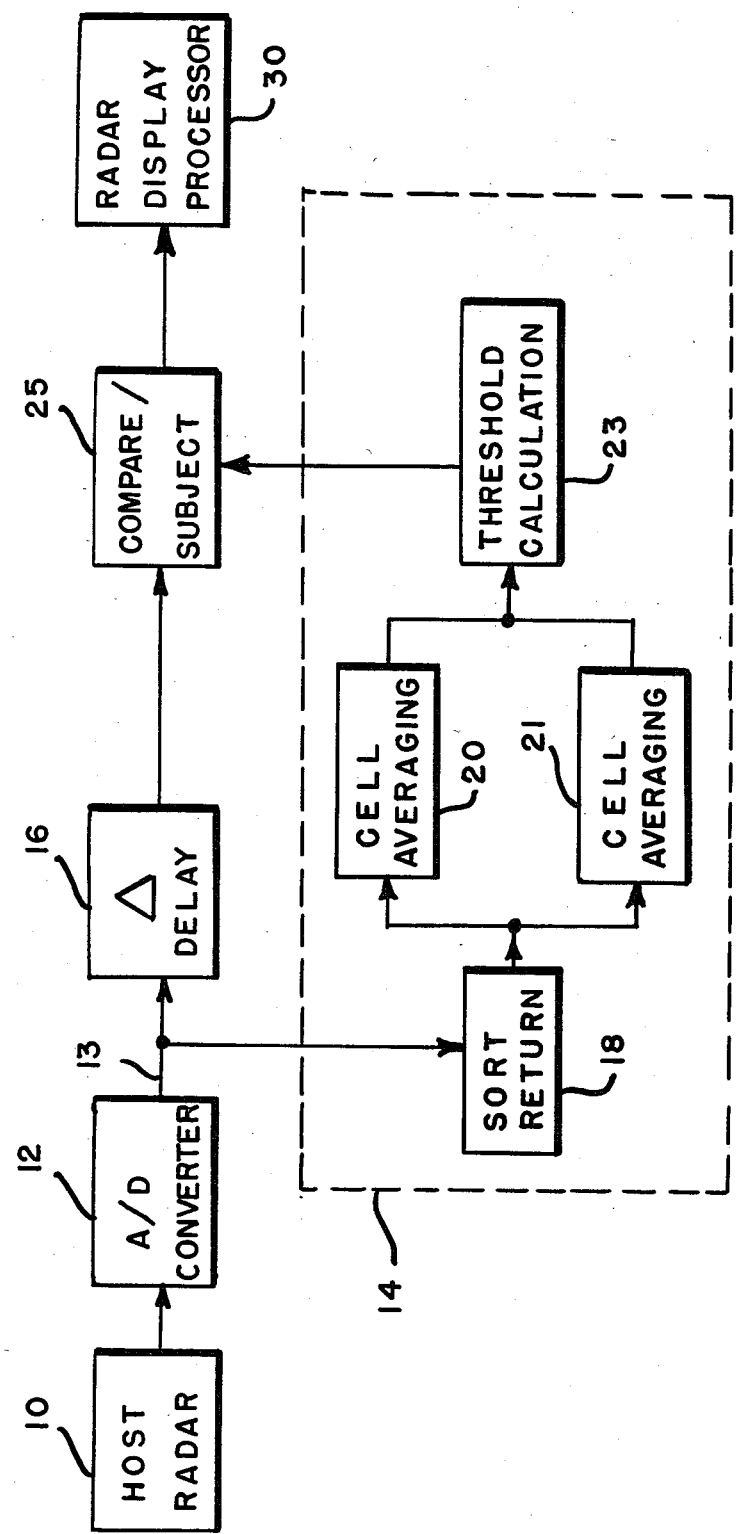

DISTRIBUTION SENSITIVE CONSTANT FALSE ALARM RATE (CFAR) PROCESSOR

STATEMENT OF GOVERNMENT INTEREST

The invention described herein may be manufactured and used by or for the Government for governmental purposes without the payment of any royalty thereon.

BACKGROUND OF THE INVENTION

The present invention relates to the signal processing of radar video signals and specifically to a means of deriving the correct threshold level from the average magnitude of echo return signals which may be used to eliminate clutter returns at precise pre-established false alarm rates.

When an object is present in the space which is scanned by a radar system, an echo returns as a return pulse in response to each of a certain number of radiated microwave pulses either to the antenna or to another similarly controlled antenna for use in receiving such a return signal from each unit azimuth region. In order to facilitate detection of a target, namely, an object to be detected, a receiver output signal produced by a receiver of the radar system is usually used to produce a visual display in which the target is included.

In practice, it is not seldom that at least one spurious object is present in the scanned space regardless of presence and absence of the target. Besides a target return or echo, namely, the return pulse from the target, such spurious objects produce spurious returns, which result in clutter in the visual display. Although the spurious objects are often referred to as a clutter, the work "clutter" will be used in the instant specification primarily to mean the spurious returns irrespective of utilization or not of a visual display. As the case may be, signals produced in the receiver from the target return and the clutter will be called a target return and clutter, respectively.

Examples of the clutter for a radar are land or ground clutter resulting from buildings and undulating terrains, sea clutter arising from sea surface, weather clutter originating with rainfall and rain clouds, and angel echoes attributed to other foreign matters, such as large flocks of migratory birds and/or atmospheric discontinuity or hererogeneity. The difference between the target return and the clutter depends on the field of use of the radar.

Since we are not interested in terrain echo returns or flocks of birds etc., it is desirable to eliminate clutter returns without adversely affecting desired target returns. This task has been alleviated to some extent by the prior art techniques given by the following patents:

U.S. Pat. No. 3,829,858 issued to Bergkvist on Aug. 13, '74,

U.S. Pat. No. 4,318,101 issued to Musha et al on Mar. 2, '82,

U.S. Pat. No. 4,249,177 issued to Chen on Feb. 3, '81,

U.S. Pat. No. 4,386,353 issued to Bleijerveld et al on May 31, '83, and

U.S. Pat. No. 4,360,811 issued to Cantwell et al on Nov. 23, '82.

The most pertinent of the prior art techniques are the disclosures of the Musha and Cantwell patents which describe radar video signal processing systems which provide a constant false alarm rate in the presence of Rayleigh or non-Rayleigh (Weibull) distributions of clutter returns.

The coverage of the radar system, in all these prior art techniques, is divided into zones made up of azimuth sectors and range rings. The zones are further divided up into cells formed by the radar scans in range levels. Musha and Cantwell use a sophisticated cell averaging technique to derive a threshold level from the average echo strength in each zone. Finally, the threshold level is applied to a gate circuit through which received radar video signals are passed in the individual cells of each relevant zone only if the radar video signals exceed the threshold level.

The patent of Bleijerveld et al describes a radar video signal processing system which calculates a new average threshold value with each change in clutter distribution.

The Chen and Bergkvist patents show other state of the art radar video signal processing systems with means to vary the threshold levels in accordance with variations in clutter distribution.

In view of the foregoing discussion it is apparent that there currently exists the need for a system of processing radar video signals which derives the correct clutter threshold level which may be used to eliminate clutter returns at pre-set false alarm rates. The correct threshold level must vary with the changes of clutter distribution observed with each set of received radar return signals and must be capable of being varied as the false alarms are changed. The present invention is directed towards satisfying that need.

SUMMARY OF THE INVENTION

This invention provides a means of deriving the correct threshold level from the average magnitude of echo return signals which may be used to eliminate clutter returns at precise amounts correlated with variable false alarm rates.

The invention employs a constant false alarm rate (CFAR) processor to receive radar video signals and derive the threshold level from the average echo strength of return signals which is calculated in terms of the selected false alarm rate.

The threshold level continuously varies with the changing conditions of the radar environment. The threshold level is also capable of being varied by the user of the host radar since it is intentionally presented in terms of the false alarm rate (e.g. by selecting another false alarm rate) the CFAR processor automatically produces the correct corresponding threshold level.

It is therefore a general object of the present invention to provide a system to enable a host radar system to suppress clutter echo returns.

So is another object of the present invention to present a system that derives a threshold level from the average strength of echo returns such that the threshold level dynamically changes to respond to each set of echo returns.

It is another object of the present invention to present a system that automatically derives the correct threshold level for corresponding false alarm rates that may be selected by the user of the host radar system.

These together with other objects, features and advantages of the invention will become more readily apparent from the following detailed description when taken in conjunction with the accompanying drawing wherein like elements are given like reference numbers throughout.

DESCRIPTION OF THE DRAWINGS

The sole FIGURE of the drawing is a sketch illustrating an embodiment of the present invention.

DETAILED DESCRIPTION OF THE PREFERRED EMBODIMENT

This invention provides a means of deriving the correct threshold level from the average magnitude of echo return signals which may be used to eliminate clutter returns at precise amounts correlated with variable false alarm rates.

The invention employs a constant false alarm rate (CFAR) processor to receive radar video signals and derive the threshold level from the average echo strength of return signals which is calculated in terms of the selected false alarm rate.

The sole FIGURE of the drawing is a sketch illustrating an embodiment of the present invention. In operation the host radar system 10 sends logarithmic video signals to an A/D (analog to digital) converter 12 which in turn applies a digital video signal V through a signal splitter to a delay circuit 16 and to the constant false alarm rate (CFAR) processor 14.

The coverage of the radar system is divided up into zones made up of azimuth sections and range rings. The zones of coverage are further divided up into cells formed by the radar scans in range levels. In this particular embodiment the radar coverage is presented in terms of range cells and doppler cells such that there exists a total of n cells representing all radar scan coverage and the total amount of echo return signals.

Of the n cells representing the total radar return signal, the CFAR processor does a sort with each set of digital radar return signals. The sort 18 arranges the cells by magnitude of the echo return signal in each cell and selects the C highest values. The constant C may be varied with different radar systems depending upon the specific coverage and number of cells. In this particular embodiment, coverage consisted of 30 cells and C was selected as 10.

From the sorting function 18, the set of C highest digital return signals is divided into two groups $c_1$ and $c_2$. The group $c_1$ contains a certain subset of c with the smallest values and $c_2$ contains the remainder of c with the highest values. For this particular embodiment c contained 10 cells, $c_1$ equalled the 4 smallest values and $c_2$ equalled the 6 highest values. Cell averaging 20 and 21 is performed on set $c_1$ and $c_2$ in realtime to obtain $\bar{X}_1$ and $\bar{X}_2$, the average of $c_1$ and $c_2$ in each set of radar return signals. The average $\bar{X}_1$ and $\bar{X}_2$ are then used to perform the threshold calculation 23.

The threshold calculation 23 is performed in three steps:

$$\text{Let } K_1 = \sum_{j=0}^{n-c_1-c_2-1} \frac{1}{n-j} + \frac{1}{c_1} \sum_{j=n-c_1-c_2}^{n-c_2} \frac{n-c_2-j}{n-j} \quad (1)$$

$$\text{And } K_2 = \sum_{j=0}^{n-c_2-1} \frac{1}{n-j} + 1 \quad (2)$$

$$\text{Then } T = \frac{1}{K_2 - K_1} (LNP + K_2)\bar{x}_1 - (LNP + K_1)\bar{x}_2 \quad (3)$$

Where
T is the Threshold
P is given false alarm rate
$\bar{x}_1 \bar{x}_2$ are the averages of the $c_1$ and $c_2$ *LNP equals the natural logarithm of P.*

Since the threshold is presented in terms of the false alarm rate P, the threshold is variable with the different false alarm values that the user of the host radar system may insert directly into the CFAR processor. Since the threshold is presented in terms of the average cell values of echo return signals, the threshold level continuously varies with the changing conditions of the radar environment.

The threshold calculation is intended to enable radar systems to compensate for the distribution of clutter returns they experience. Clutter returns are said to follow either a Rayleigh or a Weibull distribution. The Weibull distribution is expressed by a probablity density function ($P_w(x)$) as:

$$P_w(x) = (n/\sigma) \cdot (x/\sigma)^{n-1} \exp -(x/\sigma)^n, \quad (4)$$

wherein $\sigma$ and n (sometimes denoted by $\gamma$) represent a first or scale and a second or shape parameter, respectively. These parameters have values dependent of the clutter amplitude variation. The Rayleigh distribution is given by another probability density function $P_R(x)$ as:

$$P_R(x) = (2x/\sigma^2) \exp -(x/\sigma)^2, \quad (5)$$

by the use of the first parameter of the Weibull distribution probablity density function ($P_W(x)$) alone. The Rayleigh distribution is therefore the Weibull distribution of a special case where the second parameter behaves as an invariant having a specific value equal to two.

The clutter having an amplitude that follows the Weibull distribution is named Weibull clutter. The clutter having an amplitude that is given by the Rayleigh distribution is called Rayleigh clutter.

For the calculation of threshold the distribution of the returns is assumed to be Rayleigh $$F(x) = 1 - e^{-\partial x^2} \quad (6)$$

Given the average we find $$\bar{x} = \frac{1}{2} \sqrt{\frac{\pi}{x}} \quad (7)$$

Hence the threshold, T, given a false alarm rate P can be calculated from $$e^{-\partial T^2} = P \quad (8)$$

$$T = \left( \frac{-LNP}{\partial} \right)^{\frac{1}{2}} \quad (9)$$

$$T = (-LNP)^{\frac{1}{2}} \cdot \frac{2\bar{x}}{\sqrt{\pi}} \quad (10)$$

For the predominate Rayleigh Distribution this threshold should be accurate. If the distribution is not Rayleigh but is instead Weibull, $$F(x) = 1 - e^{-\partial x^B}, B < 2, \quad (11)$$

Log Normal, $$F(x) = \int_0^X \frac{1}{x\partial\sqrt{2}} e^{-LNX - B2/2\partial^2_d} x \quad (12)$$

Gamma, $$F(x) = Kx^\partial e^{-Bx} dx \quad (13)$$

The false alarm rate can become very high if the Rayleigh assumption is followed for non-Rayleigh clutter.

To avoid this, a distribution sensitive device has been designed which raises the threshold for non-Rayleigh Distributions but which has been found, on simulation, to perform equally accurately with the Rayleigh when the distribution is Rayleigh.

This device (the distribution sensitive CFAR processor) looks only at the right hand tail of the distribution and assumes that this tail is exponential, $$F(x) = 1 - e^{-\partial(x-b)} \quad (14)$$

Solutions for a and b are found from the high values in the sample using concepts from order statistics. The threshold is calculated as $$e^{-a(T-b)} = P \quad (15)$$

$$T = b - \frac{LNP}{a} \quad (16)$$

For non-Rayleigh distributions with longer tails than the Rayleigh the threshold is automatically raised. For simulations, using a sample of size 30, it was found that the threshold for non-Rayleigh Distributions was a better estimation for the distribution sensitive CFAR processor than for processing as it is now done—assuming Rayleigh whether or not it is Rayleigh.

Take a sample of size n and choose the largest c of the sample. Assume that the largest c comes from an exponential distribution, $$F(x) = 1 - e^{-\partial(x-b)}$$

Divide the sample of c into $c_1$ of the smallest and $c_2$ of the largest. (Thus we might take a sample of n=30 and choose the c=10 highest values. Of these ten we choose the $c_1=4$ smallest values and $c_2=6$ largest values.) The mean value of the $i^{th}$ largest in a sample of n from an exponential distribution is $$E(x_i) = \left( \sum_{j=0}^{i-1} \frac{1}{h-j} \right) \frac{1}{a} + b \quad (17)$$

Thus the average of the $c_1$ smallest values is $$\frac{1}{c_1} \sum_{i=n-c_1-c_2+1}^{n-c_2} E(x_i) = \bar{x}_1 \quad (18)$$

and the average of the $c_2$ highest values is $$\frac{1}{c_2} \sum_{L=n-c_2+1}^{n} E(x_i) = \bar{x}_2 \quad (19)$$

These can be simplified to $$\bar{x}_1 = \left[ \sum_{j=0}^{n-c_1-c_2-1} \frac{1}{n-j} + \frac{1}{c_1} \sum_{j=n-c_1-c_2}^{n-c_2-1} \frac{n-c_2-j}{n-j} \right] \frac{1}{a} + b \quad (20)$$

$$\bar{x}_2 = \left[ \sum_{j=0}^{n-c_2-1} \frac{1}{n-j} \right] \frac{1}{a} + b \quad (21)$$

For any sample therefore we can obtain $\bar{x}_1$ and $\bar{x}_2$ and solve these two equations for $1/a$ and b. From these we can compute the threshold T, for a false alarm rate, P $$e^{-1(T-b)} = P \quad (22)$$

$$T = \frac{1}{a}(-LNP) + b \quad (23)$$

Letting $$K_1 = \sum_{j=0}^{n-c_1-c_2-1} \frac{1}{n-j} + \frac{1}{c_1} \sum_{j=n-c_1-c_2}^{n-c_2-1} \frac{h-c_2-j}{n-j} \quad (24)$$

$$K_2 = \sum_{j=0}^{n-c_2-1} \frac{1}{n-j} \quad (25)$$

$$\frac{1}{a} = \frac{\bar{x}_2 - \bar{x}_1}{K_2 - K_1} \quad (26)$$

$$b = \frac{K_2\bar{x}_1 - K_1\bar{x}_2}{K_2 - K_1} \quad (27)$$

$$T = \frac{1}{K_2 - K_1}(LNP + K_2)\bar{x}_1 - (LNP + K_1)\bar{x}_2 \quad (28)$$

Returning to the FIGURE we find the delay circuit 16 has delayed the radar video signals while the threshold calculation was being performed. The radar video signals are next composed with the threshold level in a compare/subtract circuit 25 which passes radar video signals in the individual cells of each relevent zone only if the radar video signals exceed the threshold level.

The result is a radar display 30 which observes target returns at preset false alarm rates unobstructed by clutter.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A false alarm control system for eliminating clutter echo return signals corresponding to selectable false alarm rates and responsive to changing clutter conditions in the radar environment comprising:
  a signal splitter receiving radar video signals from a host radar system and outputting first and second sets of radar video signals;
  a constant false alarm rate processor receiving said first set of radar video signals and calculating the clutter threshold level, said clutter threshold level responsive to changing clutter conditions in the radar environment and corresponding to selectable false alarm rates, said constant false alarm rate processor comprises a data processing system sorting said radar video signals received from said signal splitter by magnitude of the echo return signals of each cell, said data processing system performing first and second cell averaging calculations for a subset of said radar video signals, said data processing system performing said clutter threshold calculation in terms of said selectable false alarm rate and said first and second cell averaging calculations, said constant false alarm rate processor performs said clutter threshold calculation defined by the equation:

$$T = \frac{1}{K_2 - K_1} (LNP + K_2)\overline{x_1} - (LNP + K_1)\overline{x_2}$$

such that

T equals the value of said clutter threshold,
P equals said selectable false alarm rate,
$\overline{X}_1$ and $\overline{X}_2$ equals the value of said first and second cell averaging calculation, and $K_1$ and $K_2$ equal the values given by $$K_1 = \sum_{j=0}^{n-c_1-c_2-1} \frac{1}{n-j} + \frac{1}{c_1} \sum_{j=n-c_1c_2}^{n-c_2} \frac{n-c_2-j}{n-j}$$

and $$K_2 = \sum_{j=0}^{n-c_2-1} \frac{1}{n-j}$$

where $c_1$ and $c_2$ equals the number of cells used in said first and second cell averaging calculations;
  a delay circuit receiving said second set of radar video signals from said signal splitter said delay circuit delaying said second set of radar video signals while said clutter threshold level is being calculated by said constant false alarm rate processor;
  and a compare circuit receiving said second set of radar video signals from said delay circuit and said clutter threshold level from said constant false alarm rate processor, said compare circuit passing on to a display processor of said host radar system the set of said radar video signals whose magnitudes exceed said clutter threshold.

* * * * *